(12) United States Patent
Yoshioka et al.

(10) Patent No.: US 7,651,776 B2
(45) Date of Patent: *Jan. 26, 2010

(54) CURING RESIN COMPOSITION CURED FILM AND ANTIREFLECTION FILM

(75) Inventors: Masahiro Yoshioka, Ibaraki (JP); Minoru Miyatake, Ibaraki (JP); Takayuki Shigematsu, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 586 days.

This patent is subject to a terminal disclaimer.

(21) Appl. No.: 10/535,681

(22) PCT Filed: Nov. 17, 2003

(86) PCT No.: PCT/JP03/14570

§ 371 (c)(1),
(2), (4) Date: May 19, 2005

(87) PCT Pub. No.: WO01/37007

PCT Pub. Date: May 25, 2001

(65) Prior Publication Data

US 2006/0052565 A1  Mar. 9, 2006

(30) Foreign Application Priority Data

Nov. 20, 2002  (JP) .............................. 2002-336093

(51) Int. Cl.
*B32B 9/04* (2006.01)

(52) U.S. Cl. ........................... 428/447; 528/10; 528/36; 528/42; 525/477

(58) Field of Classification Search ................... 528/10, 528/36, 42; 428/447, 413, 414, 421; 359/580, 359/601; 525/477
See application file for complete search history.

(56) References Cited

U.S. PATENT DOCUMENTS

| 5,723,175 | A | * | 3/1998 | Scholz et al. | ................ 427/161 |
| 5,783,299 | A | | 7/1998 | Miyashita et al. | |
| 5,800,926 | A | | 9/1998 | Nogami et al. | |
| 5,856,016 | A | | 1/1999 | Takahashi et al. | |
| 6,129,980 | A | * | 10/2000 | Tsukada et al. | ............. 428/327 |

(Continued)

FOREIGN PATENT DOCUMENTS

EP  0 776 925 A2  6/1997

(Continued)

*Primary Examiner*—Holly Rickman
*Assistant Examiner*—Linda Chau
(74) *Attorney, Agent, or Firm*—Knobbe Martens Olson & Bear LLP (57) ABSTRACT

A curing resin composition which enables formation of an antireflection layer having good antiscratchability and a cured film obtained from such a curing resin composition are disclosed. The curing resin composition contains (A) a siloxane oligomer having an average molecular weight of 500-10000 in terms of ethylene glycol and (B) a fluorine compound having a number-average molecular weight of 5000 or more in terms of polystyrene and having a fluoroalkyl structure and a polysiloxane structure.

20 Claims, 1 Drawing Sheet

U.S. PATENT DOCUMENTS

| | | |
|---|---|---|
| 6,258,347 B1 | 7/2001 | Sakuta et al. |
| 6,303,675 B1 | 10/2001 | Kobayashi et al. |
| 6,369,155 B1 | 4/2002 | Takit |
| 6,403,225 B1 | 6/2002 | Narisawa et al. |
| 6,558,804 B2 | 5/2003 | Sato et al. |
| 6,572,973 B1 | 6/2003 | Taruishi et al. |
| 7,156,530 B2 | 1/2007 | Miyatake et al. |
| 2001/0012565 A1 | 8/2001 | Nakada et al. |
| 2001/0035929 A1* | 11/2001 | Nakamura et al. .......... 349/137 |
| 2002/0055064 A1* | 5/2002 | Iguchi et al. ............. 430/270.1 |
| 2002/0127408 A1* | 9/2002 | Nishida et al. .............. 428/415 |
| 2002/0197485 A1* | 12/2002 | Nishikawa et al. ....... 428/423.1 |
| 2003/0076596 A1 | 4/2003 | Miyatake et al. |
| 2003/0077457 A1 | 4/2003 | Akamatsu et al. |
| 2003/0157317 A1* | 8/2003 | Ito et al. .................... 428/323 |
| 2004/0157065 A1 | 8/2004 | Miyatake et al. |

FOREIGN PATENT DOCUMENTS

| | | |
|---|---|---|
| EP | 1 108 692 A1 | 6/2001 |
| JP | 61-40845 | 2/1986 |
| JP | 9-208898 | 8/1997 |
| JP | 10-330619 | 12/1998 |
| JP | 2000-248183 A | 9/2000 |
| JP | 2000-352620 A | 12/2000 |
| JP | 2001-2923 A | 1/2001 |
| JP | 2001-91705 A | 4/2001 |
| JP | 2001-194505 A | 7/2001 |
| JP | 2001-235604 A | 8/2001 |
| JP | 2001-343529 A | 12/2001 |
| JP | 2002-36452 A | 2/2002 |
| JP | 2002-77680 A | 3/2002 |
| JP | 2002-235036 A | 8/2002 |
| JP | 2002-265866 A | 9/2002 |
| JP | 2003-344608 | 3/2003 |
| JP | 2003-205581 A | 7/2003 |
| JP | 2003-344608 A | 12/2003 |
| WO | WO 01/37007 A1 | 5/2001 |

* cited by examiner

Fig 1

Fig 2

CURING RESIN COMPOSITION CURED FILM AND ANTIREFLECTION FILM

This application is the U.S. National Phase under 35 U.S.C. §371 of International Application PCT/JP2003/014570, filed Nov. 17, 2003, which claims priority to Japanese Patent Application No. 2002-336093, filed Nov. 20, 2002. The International Application was not published under PCT Article 21(2) in English.

TECHNICAL FIELD

This invention relates to a curing resin composition and a cured film. A curing resin composition of the invention is useful for a material from which an antireflection layer is made and a cured film thereof forms an antireflection layer of an antireflection film. The antireflection film having an antireflection layer can be employed in combination with an optical element and used for suppressing reduction in visual recognizability on a screen image of a display such as a liquid crystal display (LCD), an organic electro luminescence (EL) display or a plasma display panel (PDP). The antireflection film having an antireflection layer can be used in, for example, a word processor, a computer, a television receiver, a monitor for car navigation, a monitor for a videocamera, a mobile phone, PHS and others.

BACKGROUND ART

A liquid crystal display has been available as one of various kinds of displays. In recent years, a request for improvement on visual recognizablility as a display device toward a wider viewing angle and a higher definition of a liquid crystal display has been more and more increased. In the course of pursuing improvement on visual recognizability of a liquid crystal display, decrease in contrast due to surface reflection on a surface of a liquid crystal display, that is a polarizing plate, cannot be neglected. Especially, reduction in visual recognizability due to surface reflection is conspicuous in various kinds of mobile information terminals, which are used outdoors with a high frequency, such as, for example, a monitor for car navigation, a monitor for a videocamera, a mobile phone and a PHS. Hence, it has been general to apply an antireflection treatment onto a polarizing plate. Especially, it is indispensable to apply an antireflection treatment onto a polarizing plate mounted to the mobile information terminal equipment.

An antireflection treatment has been designed in a way such that a multilayer laminate composed of plural thin films formed with respective materials each different in reflective index from the others is generally prepared by means of a dry treatment such as a vacuum evaporation method, a sputtering method or a CVD method so as to reduce reflection in the visible light region to the lowest possible level. A vacuum facility is, however, necessary in formation of a thin film in a dry treatment, leading to very high treatment cost. Therefore, recently, an antireflection film on which an antireflection treatment is applied by forming an antireflection film in wet coating has been prepared. An antireflection film usually has a construction of an antireflection layer with a low refractive index formed on a resin layer for imparting a hard coat property, further, formed on a transparent substrate serving as a substrate. In such an antireflection film, the hard coat layer requires a higher refractive index and the antireflection layer requires lower refractive index from the view point of a reflectance.

As a material with a low refractive index to form an antireflection layer, there has been employed a fluorine-containing polymer from the viewpoint of a refractive index and anticontamination (see, for example, JP-A No. 61-40845). For example, in JP-A No. 61-40845, there is used a coating solution obtained by dissolving a solvent-soluble fluorine-based resin with a low refractive index into an organic solvent and the coating solution is coated onto a surface of a substrate and dry the wet coat to form an antireflection layer. Since an antireflection layer formed with a fluorine-based resin has insufficient adherence to the substrate, resulting in poor anti-scratchability, the antireflection layer is peeled off with ease in a case where the layer is rubbed repeatedly. As a result, an antireflection function decreases, which leads to a problem of degrading a display quality of a screen image.

A further proposal has been made of employing a fluorine-containing compound having a polysiloxane structure in an antireflection layer (see, for example, JP-A No. 9-208898). Even such a fluorine-containing compound, however, cannot be said to have sufficient antiscratchability.

It is an object of the invention to provide a curing resin composition with which an antireflection layer good in antiscratchability can be formed and it is another object of the invention to provide a cured film obtained from the curing resin composition.

It is still another object of the invention to provide an antireflection film using the cured film. It is yet another object of the invention to provide an optical element having the antireflection film. It is a further object of the invention to provide a display on which the antireflection film or the optical element is mounted.

DISCLOSURE OF THE INVENTION

The inventors have conducted serious studies in order to solve the tasks with a resultant finding that the objects can be achieved by employing a curing resin composition shown below, which has led to completion of the invention. That is, the invention is directed to a curing resin composition containing a siloxane oligomer (A) having an average molecular weight of 500 to 10000 in terms of ethylene glycol and a fluorine compound (B) having a fluoroalkyl structure and a polysiloxane structure and having a number average molecular weight of 5000 or more in terms of polystyrene.

With the curing resin composition of the invention adopted, a siloxane oligomer (A) and a polysiloxane structure of a fluorine compound (B) react with each other to cure the composition, thereby enabling antiscratchability of the obtained cured film to be improved. No specific limitation is imposed on a siloxane oligomer (A) and any siloxane oligomer (A) can be used as far as average molecular weight is in the range of from 500 to 10000 in terms of ethylene glycol. If an average molecular weight of a siloxane oligomer (A) is less than 500, a curing resin composition is unpreferably degraded in coatability and storage stability and a coating solution has a chance to be gelled. On the other hand, if an average molecular weight of a siloxane oligomer (A) is more than 10000, sufficient antiscrathcability of a cured film cannot be unpreferably secured. An average molecular weight of a siloxane oligomer (A) is preferably in the range of from 800 to 9000. A cured film in the range is good in adherence to a substrate on which the cured film is formed and no peeling-off occurs at the interface. The average molecular weight is a value obtained by measurement with GPC.

A fluorine atom content in a curing resin composition mentioned above is preferably 20 wt % or more. A fluorine atom content in the range enables a cured film good in anticontamination to be formed. A fluorine atom content therein is preferably in the range of from 20 to 40 wt %.

A curing resin composition mentioned above preferably further contains a crosslinking compound. With a crosslinking compound adopted, a crosslinked structure is imparted to increase a strength of a cured film, thereby enabling antiscratchability to be further improved.

A curing resin composition mentioned above preferably further contains an acid generating agent. With an acid generating agent employed, a strength of a cured film is increased, thereby enabling antiscratchability to be more improved. In addition, with an acid generating agent employed, a curing reaction is preferably promoted between a siloxane oligomer (A) and a polysiloxane structure of a fluorine compound (B) to thereby simplify a manufacturing process for the cured film.

The invention is directed to a cured film obtained by curing a curing resin composition mentioned above. The cured film is useful as, for example, an antireflection layer and others.

A cured film mentioned above preferably has a ratio (Si/F) of a peak intensity of a silicon atom (Si) to a peak intensity of a fluorine atom (F) on a surface of the cured film as measured with an X-ray photoelectron spectroscopic method in the range of from 0.4 to 2. A ratio of silicon atoms (Si) to fluorine atoms (F) contained in a cured film is preferably equal to a value in the range of from 0.4 to 2 in peak intensity ratio (Si/F) on the surface of the cured film as measured with the X-ray photoelectron spectroscopic method. The ratio is more preferably equal to a value in the range of from 0.5 to 1.5. If a peak intensity ratio (Si/F) is excessively larger, it is not preferable rather because of possibility of decrease in anticontamination and increase in refractive index. On the other hand, if a peak intensity ratio (Si/F) is excessively smaller, it is not preferable rather because of possibility of decrease in strength of the cured film and increase in chargeability of the film.

The invention is directed to an antireflection film obtained by forming a hard coat layer on one surface of a transparent substrate directly or with another layer interposed therebetween and further laminating an antireflection layer on a surface of the hard coat layer, wherein the antireflection layer is constituted of a cured film.

It is preferable that, in the antireflection film, a surface of the hard coat layer has irregularity of protrusions and depressions combined and an antiglareness.

The invention is directed to an optical element on one surface or both surfaces of which the antireflection film or antireflection films are provided. An antireflection film of the invention can be used in various kinds of applications, for example in an optical element. A polarizing plate as a laminate including an antireflection film is excellent in not only antireflection function, but also a hard coat property, antiscratchability, durability and others.

The invention is directed to a display to which the antireflection film or the optical element is mounted. An antireflection film or the optical element of the invention can be used in various kinds of applications and, for example, is provided on the outermost surface of an image display or the like.

BEST MODE FOR CARRYING OUT THE INVENTION

A curing resin composition of the invention contains a siloxane oligomer (A) having an average molecular weight of 500 to 10000 in terms of ethylene glycol and a fluorine compound (B) of a fluoroalkyl structure or a polysiloxane structure and having a number average molecular weight of 5000 or more in terms of polystyrene.

No specific limitation is imposed on a siloxane oligomer (A) and any of siloxane oligomers (A) can be employed as far as it has an average molecular weight in the range. A siloxane oligomer (A) can be prepared by polymerizing a hydrolyzable alkoxysilane and a siloxane oligomer sold on the market can be used as it is. A siloxane oligomer (A) can be obtained by pouring a hydrolyzable alkoxysilane into a great amount of alcohol solvent (for example, methanol, ethanol and the like) to cause the alkoxysilane to react in the presence of water and an acidic catalyst (such as hydrochloric acid or nitric acid) at room temperature for several hours to thereby partially hydrolyze the alcoxysilane, followed by condensation polymerization thereof. A polymerization degree of siloxane oligomer (A) can be controlled by added quantities of a hydrolyzable alkoxysilane and water.

Examples of hydrolyzable alkoxysilanes include: tetraalkoxy silanes such as tetramethoxysilane, tetraethoxysilane, tetrapropoxysilane and tetrabutoxysilane; trialkoxysilanes such as methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane, vinyltrimethoxysilane, vinyltriethoxysilane, γ-aminopropyltrimethoxysilane, γ-aminopropyltriethoxysilane, γ-glycidoxypropyltrimethoxysilane, γ-glycidoxypropyltriethoxysilane, γ-methacryloxypropyltrimethoxysilane and γ-methacryloxypropyltriethoxysilane; and dialkoxysilanes such as dimethyldimethoxysilane and dimethyldiethoxysilane. Among them, preferable are tetramethoxysilane and tetraethoxysilane in consideration of improvement on antiscratchability of a cured film.

Any of fluorine compounds (B) having a fluoroalkyl structure and a polysiloxane structure can be used without placing a specific limitation on a fluorine compound having the structures, as far as a number average molecular weight is 5000 or more in terms of polystyrene. A fluorine compound (B) is obtained by heating a perfluoroalkoxysilane having an alkoxysilyl group condensable in a sol-gel reaction and hydrolyzable alkoxysilane constituted of tetraalkoxysilane, as a main component, expressed by a general formula (1) $Si(OR^1)_4$ (wherein $R_1$ indicates alkyl group having 1 to 5 carbon atoms) in an alcohol solvent (for example, methanol, ethanol or the like) in the presence of an organic acid (for example, oxalic acid) or an ester to thereby condense and polymerize both reaction components. A polysiloxane structure has been incorporated into the obtained compound (B).

Note that no specific limitation is imposed on a ratio of the reaction components and hydrolyzable alkoxysilane in a quantity of the order, usually, in the range of from 1 to 100 mol and preferably in the range of from 2 to 10 mol is added to 1 mol of perfluoroalkylalkoxysilane.

Perfluoroalkylalkoxysilanes include compounds expressed by a general formula (2) $CF_3(CF_2)_nCH_2CH_2Si(OR^2)_3$ (wherein $R^2$ indicates an alkyl group having 1 to 5 carbon atoms and n is an integer of 0 to 12). Examples thereof include: trifluoropropyltrimethoxysilane, trifluoropropyltriethoxysilane, tridecafluorooctyltrimethoxysilane, tridecafluorooctyltriethoxysilane, heptadecafluorodecyltrimethoxysilane, heptadecafluorodecyltriethoxysilane and others. Among them, preferable are compounds having n of 2 to 6.

Examples of tetraalkoxysilanes expressed by the general formula (1) $Si(OR^1)_4$ (wherein $R^1$ indicates an alkyl group having 1 to 5 carbon atoms) include tetramethoxysilane, tetraethoxysilane, tetrapropoxysilane, tetrabutoxysilane and others. Among them, preferable are tetramethoxysilane and tetraethoxysilane. Note that in preparation of a fluorine compound (B), tetraalkoxysilane as an example of the general formula (1) is usually used in quantity of 80 mol % or more of hydrolyzable alkoxysilane and the rest can be a hydrolyzable alkoxysilane not included in compounds expressed by the general formula (1).

A fluorine compound (B) preferably has a hydroxyl group and/or an epoxy group. A hydroxyl group and/or an epoxy group in a fluorine compound (B) reacts with a polysiloxane structure in a siloxane oligomer (A) or a fluorine compound (B) to increase a strength of a cured film, thereby enabling antiscratchability to be improved more. A hydroxyl group and/or an epoxy group may be introduced in either a fluoroalkyl structure or a polysiloxane structure. A hydroxyl group and/or an epoxy group can be introduced into the structure by copolymerizing a compound having the functional groups with a precursor of a fluorine compound (B).

A mixing ratio of a siloxane oligomer (A) and a fluorine compound (B) in a curing resin composition of the invention is adjusted properly so as to be adapted for an application of a cured film obtained from the composition. With increase in siloxane oligomer (A) in proportion, a fluorine compound (B) decreases in proportion, which raises a refractive index of a cured film and reduces anticontamination as a tendency. On the other hand, with decrease in siloxane oligomer (A) in proportion, a cured film decreases a strength thereof and reduces antiscratchability as a tendency. From the viewpoint of the tendencies, a proportion of a siloxane oligomer (A) is, in a curing resin composition, usually preferably in the range of from 5 to 90 wt % and more preferably in the range of from 30 to 75 wt % in terms of solid matter relative to the total of the siloxane oligomer (A) and the fluorine compound (B).

A crosslinking compound can be mixed into a curing resin composition. Examples of crosslinking compounds include: melamine resin, glycols, acrylic-based resin, azides, isocyanates and others. Among them, preferable are melamine resins such as methylolated amine, alkoxymethylated melamine and derivative thereof in consideration of storage stability of a curing resin composition. A proportion of a crosslinking compound in use is preferably 70 parts by weight or less, more preferably 30 parts by weight or less and further more preferably in the range of from 5 to 30 parts by weight relative to 100 parts by weight of a fluorine compound (B).

An acid generating agent can be mixed into a curing resin composition. An acid generating agent is preferably dissolved uniformly into the curing resin composition, while neither decomposing the curing resin composition nor reducing transparency of a cured film. Examples of acid generating agents include organic acids such as p-toluenesulfonic acid and benzoic acid; and photo acid generating agents such as a triazine-based compound. A proportion of an acid generating agent in use is preferably 10 parts by weight or less, more preferably 5 parts by weight or less and further more preferably in the range of from 0.1 to 5 parts by weight relative to 100 parts by weight of a fluorine compound (B).

A curing resin composition can be preferably prepared as a solution obtained by mixing the components so as to fall in the respective ranges. A sol prepared by dispersing silica, alumina, titania, zirconia, magnesium fluoride, ceria or the like into an alcohol solvent may be added into a curing resin composition. In addition, additives such as a metal salt, a metal compound and others can be properly mixed thereinto.

No specific limitation is placed on a solvent used in preparation of a curing resin composition and any of solvents can be employed as far as the components thereof are dissolved thereinto without being separated undissolved. Examples thereof include: ketones such as methyl ethyl ketone, methyl isobutyl ketone and cyclohexanone; esters such as ethyl acetates and butyl acetate. For the purpose of improving coatability and stability of solution, poor solvents such as alcohols can also be used in a range of content in which the components thereof are dissolved thereinto without being deposited.

No limitation is placed on a concentration of a curing resin composition in a solution and a solution with any concentration can be used as far as no stability of a solution is decreased. In a case where a curing resin composition is used as a material for forming an antireflection layer, a concentration thereof is usually about 0.1 to 20 wt %, preferably about 0.5 to 10 wt % from the viewpoint of easy handling since a thin film is necessary to be formed with a good precision in thickness.

A curing resin composition (a solution) is coated on a substrate and thereafter, the wet coat is dried and cured to thereby form a cured film. No specific limitation is placed on a coating method and any of common methods are employed, and examples thereof include a doctor blade method, a gravure roll coating method, a dipping method, a spin coating method, a brush coating method, a flexographic printing method and others.

Curing of the composition can be achieved by heating or active light irradiation so as to be adapted for a curing resin composition. While conditions for drying and curing can be determined properly giving consideration to a boiling point and a saturated vapor pressure of a solvent used, a kind of a substance or the like, in a case where a curing resin composition is employed as an antireflection layer, heating is usually conducted preferably at 160° or lower if heated and UV irradiation is usually applied preferably at a dose of 2 J/cm$^2$ or less if irradiated in order to suppress coloration or decomposition of a substrate.

Figure 1:
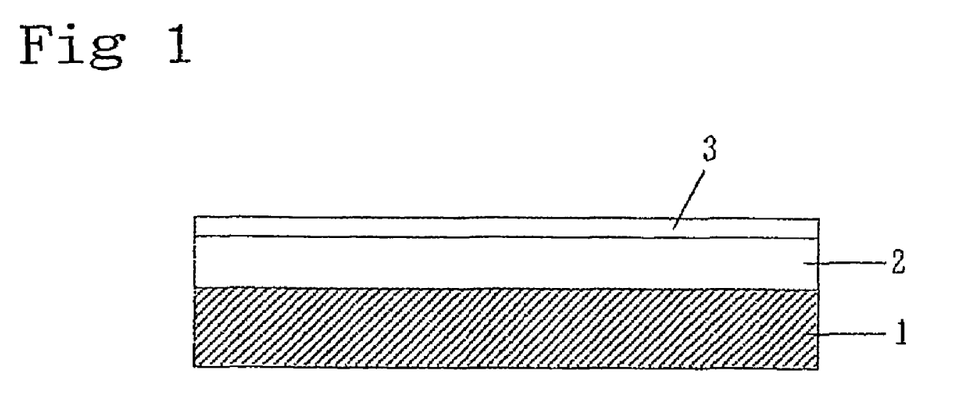
Figure 2:
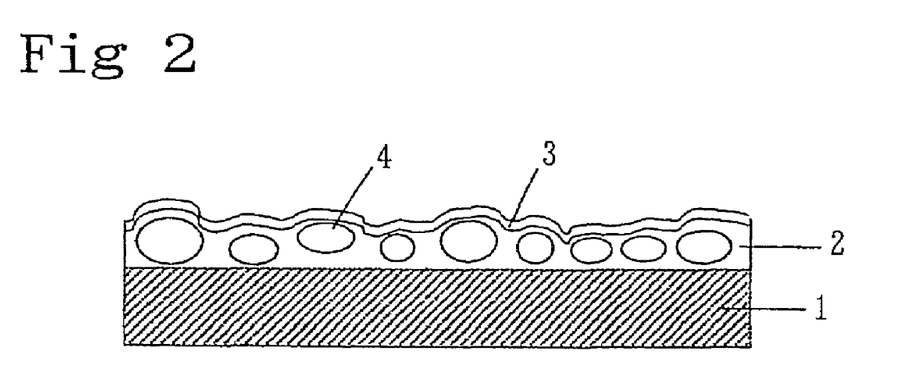

Description will be given of a preferred embodiment of the invention in a case where an antireflection layer is formed as a cured film below with reference to the accompanying drawings. FIG. 1 is an antireflection film obtained by laminating an antireflection layer 3 on a surface of a hard coat layer 2 formed on a transparent substrate 1. FIG. 2 is an antireflection film having a hard coat layer 2 in which microparticles 4 are dispersed and a surface of which is thereby roughened so as to have irregularity of depressions and protrusions combined. Note that while, in FIGS. 1 and 2, the hard coat layer 2 is laminated directly onto the transparent substrate 1, plural hard coat layers 2 can also be formed and an easily adherable layer, a conductive layer or the like can also be formed therebetween.

No specific limitation is placed on a transparent substrate 1 and any of substrates can be employed as far as they are excellent in light transmittance of visual light (with a light transmittance of 90% or more) and excellent in transparency (with a Haze value of 1% or less). Examples of transparent substrates 1 include: films formed with transparent polymers including a polyester-based polymer such as polyethyleneterephthalate or polyethylenenaphthalate; a cellulose-based polymer such as diacetyl cellulose or triacetyl cellulose; a polycarbonate-based polymer; and an acrylic-based polymer such as polymethylmethacrylate. The examples further include: films formed with transparent polymers including a styrene-based polymer such as a polystyrene, acrylonitrile-styrene copolymer; an olefin-based polymer such as polyethylene, polypropylene, a polyolefin having a cyclic or norbornene structure or ethylene-propylene copolymer; a vinyl chloride-based polymer; and an amid-based polymer such as Nylon or an aromatic polyamide. The examples still further include: films formed with transparent polymers including an imide-based polymer; sulfone-based polymer; polyether sulfone-based polymer; a polyether ether ketone-based polymer; a polyphenylene sulfide-based polymer; a vinyl alcohol-based polymer, a vinylidene chloride-based polymer, vinyl-butyral-based polymer, an allylate-based polymer, a poly-oximethylene-based polymer, an epoxy-based polymer; and blends of some or all of the polymers. Preferable is a film with a small birefringence optically. Triacetyl cellulose, polycarbonate, an acrylic-based polymer, a cycloolefin-based resin, polyolefin having a norbornene structure are preferable from the viewpoint of a protective film for a polarizing plate. The invention preferably employs a transparent substrate having difficulty in firing at high temperature such as a substrate of triacetyl cellulose. Note that triacetyl cellulose greatly degrades a characteristic thereof due to evaporation of a plasticizer in the film at 130° C. or higher.

A film as a transparent substrate 1 may be a polymer film described in JP-A No. 2001-343529 (WO 01/37007), for example a film formed with a resin composition containing (A) a thermoplastic resin having a substituted and/or a non-substituted imide group on a side chain thereof and (B) a thermoplastic resin having a substituted and/or a non-substituted phenyl group and a nitrile group on a side chain thereof. A concrete example thereof is a film of resin composition containing an alternating copolymer composed of isobutylene and N-methymaleimide and an acrylonitrile-styrene copolymer. As a film, there can be used a film constituted of a mixed extruded product of the resin composition.

A transparent substrate that can be especially preferably used from the viewpoint of a polarization characteristic and durability is a triacetyl cellulose film a surface of which is saponification-treated with alkali or the like. While a thickness of a transparent substrate 1 can be properly determined, the thickness is generally about 10 to 500 μm from the standpoint of strength and workability such as handlability, and a requirement for being a thin layer. The thickness is especially preferably 20 to 300 μm and more preferably 30 to 200 μm.

A substrate film is preferably colored as little as possible. Therefore, a preferable protective film that is used has a phase difference value in the film thickness direction expressed by $Rth=[(nx+ny)/2-nz]\cdot d$ (wherein nx and ny are in-plane main refractive indexes and nz is a refractive index in the film thickness direction, and d is a film thickness) is in the range of from −90 nm to +75 nm. With a substrate film having a thickness direction phase difference value (Rth) in the range of from −90 nm to +75 nm adopted, coloration (optical coloration) of a polarizing plate caused by a protective film can be eliminated to almost nothing. A thickness direction phase difference value (Rth) is preferably in the range of from −80 nm to +60 nm and especially preferably in the range of from −70 nm to +45 nm.

No specific limitation is imposed on a hard coat layer 2 and any hard coat layer can be used as far as it is excellent in a hard coat property, has a sufficiently strength and is excellent in light transmittance. Examples of resins forming a hard coat layer 2 include: a thermosetting resin, a thermoplastic resin, an ultraviolet curing resin, an electron curing resin, a two-part mixed resin and others, among which preferable is an ultraviolet curing resin capable of forming a hard coat layer in a simple process including a curing treatment with ultraviolet irradiation with a good efficiency. Examples of ultraviolet curing resins include a polyester-based, an acrylic-based, a urethane-based, an amide-based, a silicone-based, an epoxy-based and others, each of which contains a monomer, an oligomer and a polymer of an ultraviolet curing type. Ultraviolet curing resins that are preferably employed are, for example, ultraviolet curing resins each having an ultraviolet polymerizable functional group, among which preferable are ultraviolet curing resins containing an acrylic-based monomer and an acrylic-based oligomer each having two or more functional groups and especially three to six functional groups. An ultraviolet polymerization initiator is mixed in an ultraviolet curing resin.

A surface of a hard coat layer 2 can be imparted antiglareness by forming microirregurality of depressions and protrusions combined. No specific limitation is imposed on a method forming microirregurality of depressions and protrusions combined on the surface and any of proper methods can be adopted. Examples of methods include a method forming microirregurality of depressions and protrusions structure on a surface of a film, on which a hard coat layer 2 is formed, by surface roughening in advance by a proper operation such as a sand blasting, embossing rolling, chemical etching or the like to thereby form microirregurality of depressions and protrusions structure on the surface of a material itself which constitutes the hard coat layer 2. There has been available another method for forming microirregurality of depressions and protrusions structure on a surface of the resin film in a procedure in which a second hard coat layer 2 is coated on a first hard coat layer 2 and a die transfer scheme is applied thereon. There has been available still another method for forming microirregurality of depressions and protrusions structure on a hard coat layer 2 by dispersing microparticles 4 in a hard layer 2 to be contained therein as shown in FIG. 2. Two or more kinds of methods mentioned above may be combined with each other to thereby form a layer having a surface with microirregularities of depressions and protrusions structures in respective different states with each other thereon. Among the methods each for forming-the hard coat layer 2, preferable is a method providing a hard coat layer 2 in which microparticles 4 are contained in a dispersion state from the viewpoint of formation of a surface with microirregularities of depressions and protrusions combined.

Description will be given of a method providing a hard coat layer 2 in which microparticles 4 are contained in a dispersion state. No specific limitation is imposed on a microparticle 4 and any of various kinds of metal oxides, glass, plastic and others can be used as a microparticle as far as it is transparent. Examples thereof include: metal oxides such as silica, zirconia, titania and calcium oxide; inorganic conductive microparticles such as macroparticles of alumina, tin oxide, indium oxide, cadmium oxide and antimony oxide; a crosslinked or a non-crosslinked organic maicroparticle made from each of various kinds of polymers such as polymethylmethacrylate, polystyrene, polyurethance, acrylic-styrene copolymer, benzoguanamine, melamine and polycarbonate; a silicone microparticle and others. Note that no specific limitation is imposed on a shape of a microparticle and either a bead in the shape of a sphere or an irregularly shaped powder may be employed. The kinds of microparticles 4 can be properly selected for use, alone or two or more kinds thereof in mixture. An average diameter of microparticles in use are usually in the range of from 1 to 10 μm and preferably in the range of from 2 to 5 μm. Ultramicroparticles made from a metal oxide can be dispersed into a microparticle or the microparticle may be impregnated with the ultramicroparticles for the purpose to control a refractive index thereof or to impart conductivity thereto. A proportion of microparticles 4 is properly determined in consideration of an average particle diameter thereof, a thickness of a hard coat layer and the like. The proportion generally is preferably about 1 to 20 parts by weight and more preferably about 5 to 15 parts by weight relative to 100 parts by weight of a resin.

Additives such as a leveling agent, a thixotropic agent and an antistatic agent can be used in the ultraviolet curing resin (used for formation of a hard coat layer 2). Use of a thixotropic agent therein is advantageous in formation of projected particles on a surface with a microirregularity of depressions and protrusions combined. Examples of thixotropic agents include silica, mica, smectite and others, all being particles each having a size of 0.1 μm or less.

No specific limitation is imposed on a method for forming a hard coat layer 2 and any of proper methods can be adopted. For example, a resin (containing microparticles 4 properly) is coated on a transparent substrate 1 described above and the wet coat is dried and then cured. In a case where a resin contains microparticles 4, the resin forms a hard coat layer 2 having irregularity of depressions and protrusions combined on a surface thereof. A resin mentioned above is coated with one of proper methods such as fountain coating, die coating, casting, spin coating, fountain metering, gravure coating. Note that in the coating, the resin may be diluted with one of common solvents such as toluene, ethyl acetate, butyl acetate, methyl ethyl ketone, methyl isobutyl ketone, isopropyl alcohol and ethyl alcohol, or alternatively, the resin can also be coated as it is without being diluted. While no specific limitation is placed on a thickness of the hard coat layer 2, the thickness is preferably about 0.5 to 20 μm and especially preferably 1 to 10 μm.

A lower refractive index of a hard coat layer 2 raises a reflectance, leading to a possibility of degrading an antireflection function. On the other hand, an excessively high refractive index of a hard coat layer 2 unpreferably colors reflected light. A refractive index of a hard coat layer is in the range of from 1.50 to 1.75 in $n_d^{20}$ (a refractive index at 20° C.). A refractive index of a hard coat layer can be properly adjusted so as to be adapted for optics of an reflectance as a target.

An antireflection layer 3 is constituted of a cured film of the invention. In a structure of an antireflection layer (a low refractive index layer)/a hard coat layer, a lower refractive index of the antireflection layer is more preferable in order to exert a good antireflection effect. On the other hand, an excessively low refractive index of an antireflection layer unpreferably colors reflected light. A refractive index $n_d^{20}$ (a refractive index at 20° C.) of an antireflection layer is in the range of from 1.35 to 1.45 and preferably in the range of from 1.37 to 1.42.

No specific limitation is placed on a thickness of an antireflection layer and the thickness is preferably about 0.05 to 0.3 μm and especially preferably 0.1 to 0.3 μm. A thickness of an antireflection layer is preferably determined by a refractive index of a material from which an antireflection film is made and a design wavelength of incident light. For example, in a case where a refractive index of a hard coat layer is 1.51, a refractive index of an antireflection layer is 1.38 and a design wavelength of incident light impinging on the antireflection layer is 550 nm, a thickness of the antireflection layer is calculated as about 0.1 μm.

An optical element (not shown) can be adhered to the transparent substrate 1 having the antireflection film thereon in FIG. 1 or FIG. 2.

As example of optical elements, a polarizer may be mentioned. The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with Iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A transparent protective film is usually provided on one side or both sides of the above described polarizer to be used as a polarizing plate. As a transparent protective film, materials excellent in transparency, mechanical strength, heat stability, water shielding property, isotropy, etc. are preferable. As transparent protective films, a film of same material as the transparent base film in the above described illustration may be used. As the above described transparent protective film, a transparent protective film whose both sides, surface side and backside, are formed from same polymer material may be used, and also a transparent protective film whose both sides are formed by different polymer materials etc. may be used. When the antireflection films are prepared on one side or both sides of a polarizer (polarizing plate), a transparent base film of the antireflection film may also serve as a transparent protective film of the polarizer.

As the opposite side of the polarizing-adhering surface above-mentioned transparent protective film, a film with a hard coat layer and various processing aiming for sticking prevention and diffusion or anti glare may be used. A hard coat processing is applied for the purpose of protecting the surface of the polarization plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Besides, a sticking prevention processing is applied for the purpose of adherence prevention with adjoining layer. In addition, the above described hard coat layer and sticking prevention layer etc. may be built in the protection film itself, and also they may be prepared as an optical layer different from the protection layer.

Moreover, for example, a hard coat layer, a primer layer, an adhesive layer, a pressure sensitive adhesive layer, an antistatic layer, an electrically conductive layer, a gas barrier layer, a steam barrier layer, a moisture barrier layer, etc. may be inserted in between layers of polarizing plates, or these may be laminated on a surface of the polarizing plate.

Besides, in a stage for forming each layer of the polarizing plate, for example, if required, various characteristics may be improved by adding or mixing conductive particles, antistatic agents, various particles, plasticizers, etc. into forming materials of each layer.

As optical elements, an optical film in which other optical elements (optical layers) is laminated to the above described polarizing plate may be used on the occasion of practical use. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a biaxial stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively. Although a laminating of the above described antireflection film to the optical element and of the various optical layer to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, which at least one layer of the optical element is laminated with the antireflection film, while a layer not prepared the antireflection film an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains particle and shows optical diffusion nature.

Proper method may be carried out to attach an adhesive layer to the optical element, such as the polarizing plate, the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or a optical film top using suitable developing methods, such as flow method and coating method, or a method in which an adhesive layer is once formed on a separator, as mentioned above, and is then transferred on a polarizing plate or an optical film may be mentioned. An adhesive layer may also be prepared on each layer as a layer in which pressure sensitive adhesives with different composition or different kind etc. are laminated together. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as sailcylic acid ester type compounds, benzophenol type compounds, benzotriazol type compounds, cyano acrylate type compounds, and nickel complex salt type compounds.

An optical element prepared with the antireflection film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent base film in an order configuring an illuminant (organic electro luminescence illuminant). Here, a organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic emitting layer is formed by a very thin film about 10 nm in thickness. For this reason, light is transmitted nearly completely through organic emitting layer as through transparent electrode. Consequently, since the light that enters, when light is not emitted, as incident light from a surface of a transparent base film and is transmitted through a transparent electrode and an organic emitting layer and then is reflected by a metal electrode, appears in front surface side of the transparent base film again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light Into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent base film, the transparent electrode and the organic thin film, and is reflected by the metal electrode, and then is transmitted through the organic thin film, the transparent electrode and the transparent base film again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLE

While concrete description will be given of the invention below using examples, it should be understood that the invention is not limited in any way by the examples.

Example 1

(Preparation of Curing Resin Composition)

Used were OPSTAR JTA105 (manufactured by JSR Corp., with a solid matter content of 5 wt %) as a composition containing a fluorine compound (B), polyethylene glycol, hexamethylolmelamine and an acid generating agent. Used was JTA105A (manufactured by JSR corp. with a solid matter content of 5 wt %) as a curing agent. A number average molecular weight of the fluorine compound (B) was 8000 in terms of polystyrene. Used was Colcoat N103 (manufactured by Colcoat Co., with a solid matter content of 2 wt %) as a siloxane oligomer (A). Colcoat N103 was a dimethylsiloxane oligomer having an average molecular weight of 950.

Mixed together were 100 parts by weight of OPSTAR JTA105, 1 part by wt of JTA 105A, 590 parts by weight of Colcoat N103 and 151.5 parts by weight of butyl acetate to thereby prepare a curing resin composition. A fluorine atom content in the curing resin composition was 24 wt %. Note that the fluorine atom (F) content was a calculated percentage relative to a total, as 100, of atoms including C, N, O, F and Si present on a surface of the composition as measured with an X-ray photoelectron spectroscopic method (XPS).

(Preparation of Hard Coat Resin Composition)

Mixed together were 100 parts by weight of UNIDIC 17-806 (manufactured by DAINIPPON INK CHEMICAL INDUSTRY Co., Ltd.) as a urethane acrylate monomer, 14 parts by weight of SX-350-H (manufactured by Soken Chemical Co., Ltd.) as a crosslinking polystyrene particles, 0.1 parts by wt of Lucentite SAN (Coop Chemical Co. Ltd.) as a thixotropic agent, 5 parts by weight of Irgacure 907 (manufactured by Ciba Specialty Chemicals Co. Ltd.) as a photopolymerization initiator, 0.5 parts by wt of Megafac F470 (manufactured by DAINIPPON INK CHEMICAL INDUSTRY Co., Ltd.) as a leveling agent and 187.4 parts by weight of toluene to thereby prepare a hard coat resin composition.

(Preparation of Polarizing Plate with Antireflection Film Thereon)

Triacetyl cellulose films each having a thickness of 80 µm were adhered on both surfaces of a iodine-polyvinyl alcohol polarizer having a thickness of 26 µm with a polyvinyl alcohol adhesive interposed therebetween to thereby prepare a polarizing plate. The hard coat resin composition was coated on one surface of the polarizing plate using a wire bar, a solvent was evaporated to dry the wet coat and thereafter, the dried coat was irradiated with ultraviolet from a low pressure UV lamp to thereby form a hard coat layer having a thickness of 5 µm. A refractive index of the resin with which the hard coat layer was formed was 1.52. Subsequent to this, the curing resin composition prepared as described above was coated on the hard coat layer using a wire bar to a thickness of about 100 nm after curing, the coat was heated and cured at 135° C. for 3 minutes to thereby form an antireflection layer and to thus prepare a polarizing plate having the antireflection film thereon. A refractive index of the antireflection layer was 1.43.

Example 2

A hard coat resin composition was prepared in a similar way to that in Example 1 with the exception that in preparation of the curing resin composition in Example 1, crosslinking polystyrene particles were not mixed into the hard coat resin composition of Example 1. Subsequent to this, a polarizing plate with an antireflection film thereon was prepared in a similar way to that in Example 1 with the exception that the hard coat resin composition was employed.

Example 3

A curing resin composition was prepared in a similar way to that in Example 1 with the exception that in preparation of the curing resin composition in Example 1, mixed together were 100 parts by weight of OPSTAR JTA105, 1 part by wt of JTA 105A, 252.5 parts by weight of Colcoat N103 and 151.5 parts by weight of butyl acetate. Subsequent to this, a polarizing plate with an antireflection film thereon was prepared in a similar way to that in Example 1 with the exception that the curing resin composition was employed. A refractive index of an antireflection layer was 1.42.

Example 4

A curing resin composition was prepared in a similar way to that in Example 1 with the exception that in preparation of the curing resin composition in Example 1, mixed together were 100 parts by weight of OPSTAR JTA105, 1 part by wt of JTA 105A, 2272.5 parts by weight of Colcoat N103 and 151.5 parts by weight of butyl acetate. Subsequent to this, a polarizing plate with an antireflection film thereon was prepared in a similar way to that in Example 1 with the exception that the curing resin composition was employed. A refractive index of an antireflection layer was 1.44.

Example 5

A curing resin composition was prepared in a similar way to that in Example 1 with the exception that in preparation of the curing resin composition in Example 1, Colcoat P (a diethylsiloxane oligomer with an average molecular weight of 8000, manufactured by Colcoat Co.) was used instead of Colcoat N103 (manufactured by Colcoat Co.) as a siloxane oligomer (A). A fluorine atom content in the curing resin composition was 23 wt %. Subsequent to this, a polarizing plate with an antireflection film thereon was prepared in a similar way to that in Example 1 with the exception that the curing resin composition was employed. A refractive index of an antireflection layer was 1.43.

Comparative Example 1

A curing resin composition was prepared in a similar way to that in Example 1 with the exception that in preparation of the curing resin composition in Example 1, no Colcoat N103 (manufactured by Colcoat Co.) was used. Subsequent to this, a polarizing plate with an antireflection film thereon was prepared in a similar way to that in Example 1 with the exception that the curing resin composition was employed. A refractive index of an antireflection layer was 1.39.

Reference Example 1

A curing resin composition was prepared in a similar way to that in Example 1 with the exception that in preparation of the curing resin composition in Example 1, mixed together were 100 parts by weight of OPSTAR JTA105, 1 part by wt of JTA 105A, 108.2 parts by weight of Colcoat N103 and 151.5 parts by weight of butyl acetate. Subsequent to this, a polarizing plate with an antireflection film thereon was prepared in a similar way to that in Example 1 with the exception that the curing resin composition was employed. A refractive index of an antireflection layer was 1.41.

Comparative Example 2

A curing resin composition was prepared in a similar way to that in Example 1 with the exception that in preparation of the curing resin composition in Example 1, tetraethoxy silane (partial condensate with an average molecular weight of about 200) was used instead of Colcoat N103 (manufactured by Colcoat Co.). The curing resin composition was gelled in some time after preparation, thereby disabling the composition to be coated.

The following evaluation was conducted on the polarizing plates each with an antireflection film thereon obtained in the examples and the comparative examples. The results of the evaluation are shown in Table 1.

(Measurement of Refractive Index)

A black acrylic plate (with a thickness of 2 mm) was adhered to a surface of a polarizing plate on which no antireflection layer was formed with a pressure sensitive adhesive to thereby prevent reflection on the rear surface. A spectral reflectance (a mirror-surface reflectance+a diffusion reflectance) of a sample was measured using an inclined integrating sphere spectrophotometer (UV-2400/80°) manufactured by Shimadzu Corp. to calculate a total reflection (%, value Y) in a C light source/2° view field.

(Si/F on Surface of Antireflection Layer)

A ratio of Si to F present on a surface of an antireflection layer was analyzed using an X-ray photoelectron spectroscopic method (XPS) to obtain a peak intensity ratio (Si/F). A measuring instrument was AXIS-HS1 manufactured by Shimadzu Corp.

(Antiscratchability)

A polarizing plate with an antireflection film thereon was cut off into a piece with a size of 25 mm in width and 100 mm in length and a surface of the polarizing plate on which no antireflection film was formed was adhered to a glass plate. A surface of an antireflection layer was moved forward and backward 10 cycles at a speed of about 100 mm/sec on a smooth sectional surface of a cylinder with a diameter of 25 mm with steel wool #0000 placed thereon under a load of 400 g. A reflectance was measured after the test with a method similar to that described above. Changes between reflectance before and after each test for antiscrachability are shown in Table 1. More of scratches results in observation of irregular reflection accompanied with roughening due to irregularity of depressions and protrusions combined and of increase in reflectance accompanied with non-uniformity in optical thickness of an antireflection layer.

TABLE 1

|  | Total reflection (%) | Si/F ratio | Antiscratchability (%) |
|---|---|---|---|
| Example 1 | 2.4 | 0.55 | +0.05 |
| Example 2 | 2.2 | 0.55 | +0.06 |
| Example 3 | 2.2 | 0.41 | +0.1 |
| Example 4 | 2.5 | 0.83 | +0.04 |
| Example 5 | 2.4 | 0.54 | +0.06 |
| Comparative Example 1 | 2.1 | 0.28 | +1.9 |
| Reference Example 1 | 2.1 | 0.36 | +1.0 |

As shown in the results described above, it is understood that an antireflection layer good in antiscratchability is formed in each of the examples and the antireflection layer is excellent in an antireflection characteristic.

INDUSTRIAL APPLICABILITY

A curing resin composition of the invention is useful for a material from which an antireflection layer is made and a cured film thereof forms an antireflection layer of an antireflection film. The antireflection film having an antireflection layer can be employed in combination with an optical element and used for suppressing reduction in visual recognizability on a screen image of a display such as a liquid crystal display (LCD), an organic EL display or a PDP. The antireflection film having an antireflection layer can be used in, for example, a word processor, a computer, a television receiver, a monitor for car navigation, a monitor for a videocamera, a mobile phone, PHS and others.

The invention claimed is:

1. A curing resin composition containing
    a siloxane oligomer (A) having an average molecular weight of 500 to 10000 in terms of polyethylene glycol and
    a fluorine compound (B) having a fluoroalkyl structure and a polysiloxane structure and having a number average molecular weight of 5000 or more in terms of polystyrene,
    wherein the fluorine compound contains a hydroxyl group and/or an epoxy group which are reactive with the siloxane oligomer or the polysiloxane structure in the fluorine compound.

2. The curing resin composition according to claim 1, wherein a fluorine atom content in the curing resin composition is 20 wt % or more.

3. The curing resin composition according to claim 1, further containing a crosslinking compound selected from the group consisting of melamine resin, acrylic resin, azide and isocyanate.

4. The curing resin composition according to claim 1, further containing an acid generating agent selected from the group consisting of a p-toluenesulfonic acid, a benzoic acid and a triazine-containing component.

5. A cured film obtained by curing a curing resin composition according to claim 1.

6. The cured film according to claim 5, wherein a ratio (Si/F) of a peak intensity of a silicon atom (Si) to a peak intensity of a fluorine atom (F) on a surface of the cured film as measured with an X-ray photoelectron spectroscopic method is in the range of from 0.4 to 2.

7. An antireflection film comprising a hard coat layer formed on one surface of a transparent substrate directly or with another layer interposed there between and an antireflection layer laminated on a surface of the hard coat layer, wherein the antireflection layer is constituted of a cured film according to claim 5.

8. The antireflection film according to claim 7, wherein a surface of the hard coat layer has irregularity of protrusions and depressions combined and an antiglareness.

9. An optical element on one surface or both surfaces of which an antireflection film or antireflection films according to claim 7 are provided.

10. An image display to which an antireflection film according to claim 7 is mounted.

11. The curing resin composition according to claim 2, further containing a crosslinking compound selected from the group consisting of melamine resin, acrylic resin, azide and isocyanate.

12. The curing resin composition according to claim 2, further containing an acid generating agent selected from the group consisting of p-toluenesulfonic acid, benzoic acid and a triazine-based compound.

13. The curing resin composition according to claim 3, further containing an acid generating agent selected from the group consisting of p-toluenesulfonic acid, benzoic acid and a triazine-based compound.

14. The curing resin composition according to claim 11, further containing an acid generating agent selected from the group consisting of p-toluenesulfonic acid, benzoic acid and a triazine-based compound.

15. A curable resin composition comprising:
    (A) a siloxane oligomer having an average molecular weight of 500 to 10000 in terms of polyethylene glycol; and
    (B) a fluorine compound having a fluoroalkyl structure and a polysiloxane structure and having a number average molecular weight of 5000 or more in terms of polystyrene, wherein a ratio of A/(A+B) by solid weight is 0.05-0.9,
    said composition being curable by heat or active light irradiation by reacting the siloxane oligomer and the polysiloxane structure in the fluorine compound,
    wherein the fluorine compound contains a hydroxyl group and/or an epoxy group which are reactive with the siloxane oligomer or the polysiloxane structure in the fluorine compound.

16. The curable resin composition according to claim 15, further comprising a crosslinking agent in an amount of 70 parts or less by weight with respect to the fluorine compound, wherein said crosslinking agent is selected from the group consisting of melamine resin, acrylic resin, azide and isocyanate.

17. A cured film using the curable resin composition of claim 15, having a cured structure of: (A) the siloxane oligomerglycol and (B) the fluorine compound, said siloxane oligomer and said polysiloxane structure in the fluorine compound being reacted.

18. The cured film according to claim 17, which has an additional cured structure wherein the fluorine compound contains a hydroxyl group and/or an epoxy group which have reacted the siloxane oligomer or the polysiloxane structure in the fluorine compound.

19. An image display to which the optical element according to claim 9 is mounted.

20. The curing resin composition according to claim 1, wherein the siloxane oligomer (A) is prepared by polymerizing a hydrolyzable alkoxysilane and a siloxane oligomer.

* * * * *

UNITED STATES PATENT AND TRADEMARK OFFICE
CERTIFICATE OF CORRECTION

PATENT NO. : 7,651,776 B2 Page 1 of 2
APPLICATION NO. : 10/535681
DATED : January 26, 2010
INVENTOR(S) : Masahiro Yoshioka et al.

It is certified that error appears in the above-identified patent and that said Letters Patent is hereby corrected as shown below:

Title page, Item (54), under Title, after "COMPOSITION" please insert --,--.

At Column 1, Line 1, after "COMPOSITION" please insert --,--.

At Column 1, Line 33, please delete "recognizablility" and insert --recognizability--, therefor.

At Column 2, Line 58, please delete "antiscrathcability" and insert --antiscratchability--, therefor.

At Column 4, Line 23, please delete "alcoxysilane," and insert --alkoxysilane,--, therefor.

At Column 5, Line 42, please delete "methylolated" and insert --methylated--, therefor.

At Column 7, Line 31, please delete "N-methymaleimide" and insert --N-methylmaleimide--, therefor.

At Column 8, Line 13, please delete "microirregurality" and insert --microirregularity--, therefor.

At Column 8, Line 15, please delete "microirregurality" and insert --microirregularity--, therefor.

At Column 8, Line 18, please delete "microirregurality" and insert --microirregularity--, therefor.

At Column 8, Line 22, please delete "microirregurality" and insert --microirregularity--, therefor.

At Column 8, Line 25, please delete "microirregurality" and insert --microirregularity--, therefor.

At Column 8, Line 30, please delete "microirregurality" and insert --microirregularity--, therefor.

At Column 8, Line 35, please delete "microirregularities" and insert --microirregularities--, therefor.

Signed and Sealed this

Twenty-third Day of November, 2010

David J. Kappos
*Director of the United States Patent and Trademark Office*

CERTIFICATE OF CORRECTION (continued)
U.S. Pat. No. 7,651,776 B2

At Column 8, Line 37, please delete "forming-the" and insert --forming the--, therefor.

At Column 8, Lines 40-41, please delete "microirreguralities" and insert --microirregularities--, therefor.

At Column 8, Line 49, please delete "macroparticles" and insert --microparticles--, therefor.

At Column 8, Line 51, please delete "maicroparticle" and insert --microparticle--, therefor.

At Column 8, Line 53, please delete "polyurethance," and insert --polyurethane,--, therefor.

At Column 10, Line 13, please delete "Iodine" and insert --iodine--, therefor.

At Column 16, Line 26, please delete "sailcylic" and insert --salicylic--, therefor.

At Column 17, Line 57, please delete "Into" and insert --into--, therefor.